United States Patent Office 3,018,805
Patented Jan. 30, 1962

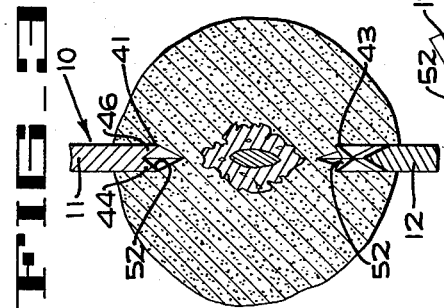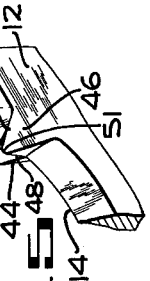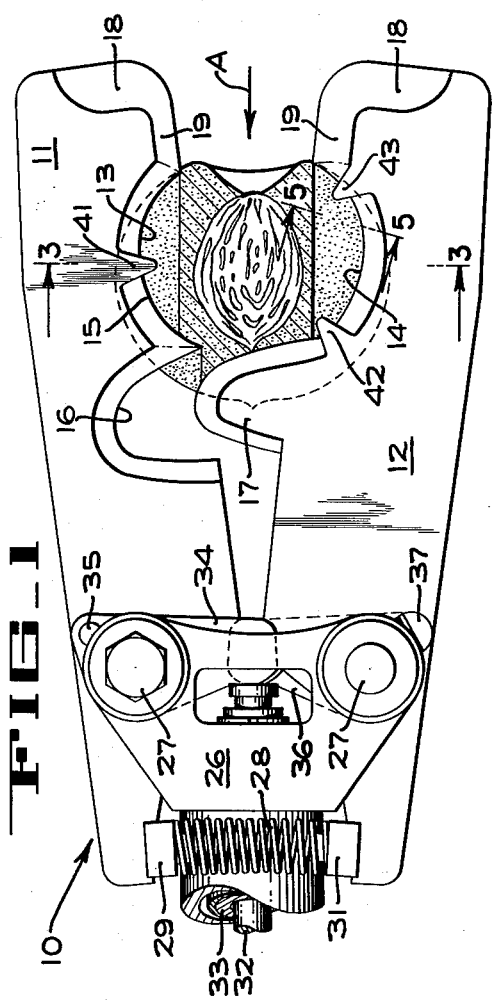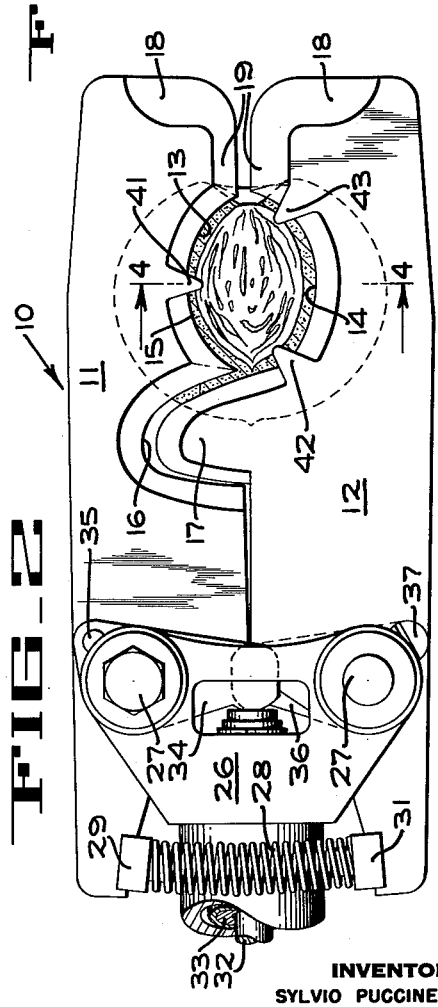

3,018,805
PIT GRIPPING DEVICE
Sylvio Puccinelli, San Jose, Calif., assignor to FMC Corporation, a corporation of Delaware
Filed June 12, 1959, Ser. No. 819,884
4 Claims. (Cl. 146—28)

The present invention appertains to fruit processing apparatus and more particularly relates to pitting apparatus having means for cutting the meat and gripping the pit of a fruit, such as a peach.

In one method of pitting peaches, two aligned blades are forced into each peach from opposite sides of the peach along the suture plane. The blades bisect the meat of the peach and come into firm gripping engagement with opposite sides of the pit. While the pit is held by the blades, the peach halves are twisted to separate the peach halves from the pit. Since peach pits frequently split in half along their suture planes if gripped directly on the raised edges which lie on either side of the suture plane, and since considerable pressure must be exerted by the blades to grip the pit to resist twisting of the fruit, considerable difficulty has been experienced in obtaining pit gripping blades that are capable of applying adequate gripping pressure without breaking the pit.

It is, therefore, one object of the present invention to provide an improved apparatus for severing the meat and gripping the pit of a fruit.

Another object is to provide improved pit gripping blades capable of bisecting the flesh of a peach and gripping the pit without breaking the pit.

These and other objects and advantages of the present invention will become apparent from the following description and the accompanying drawings, in which:

FIG. 1 is a side elevation of the fruit cutting and pit gripping apparatus of the present invention shown in an open position with a partially cut peach supported therein, the peach being shown in section.

FIG. 2 is a side elevation similar to FIG. 1 but showing the cutting and gripping apparatus in a pit gripping position.

FIG. 3 is a section taken along line 3—3 of FIG. 1.

FIG. 4 is a section taken along line 4—4 of FIG. 2.

FIG. 5 is an enlarged fragmentary perspective taken looking in the direction of the arrows 5—5 in FIG. 1.

The fruit cutting and pit gripping apparatus 10 (FIGS. 1, 2 and 3) of the present invention comprises a pair of blades 11 and 12, having concave pit recesses 13 and 14, respectively, which define a pit receiving opening 15. The blade 11 is concavely cut-away as at 16 to receive a convex projection 17 of the blade 12 when the blades 11 and 12 are positioned as shown in FIG. 2. The blades 11 and 12 are sharpened at their forward edges 18 and along straight edge portions 19 adjacent edges 18. Also, the blades are sharpened along the recesses 13 and 14, along the cut-away portion 16, and along the projection 17.

The blades 11 and 12 lie in the same plane and are pivotally connected to a support member 26 by bolts 27. A pair of compression springs 28, one only being shown, are disposed between ears 29 and 31, secured to the rear end portions of the blades 11 and 12, respectively, and serve to move the blades into pit gripping engagement as shown in FIG. 2. The blades 11 and 12 are moved to the open position by a rod 32 which is slidably supported in a tubular support 33. The rod 32 bears against a lever arm 34 which is rigidly secured to the blade 11 by a capscrew 35, and against a lever 36 which is secured to the blade 12 by a capscrew 37. The rod 32 is arranged to be reciprocated by any suitable means, such as by a cam (not shown) on the associated fruit processing machine, to control the opening and closing of the blades 11 and 12.

A double V-shaped tooth 41 (FIGS. 1 and 3) is integral with and extends inwardly from the sharpened edge of the blade adjacent the pit recess 13. Likewise, two double teeth 42 and 43, which are identical to the tooth 41, are integral with the recess 14 and extend inwardly from the sharpened edge of blade 12. As shown in FIG. 2, it is apparent that the three double teeth 41, 42 and 43 cooperate to provide a positive three point gripping engagement thereby assuring that each tooth is firmly seated on the pit. The configurations of the three teeth are the same, each tooth having two spaced elements 44 and 46 (FIG. 3). The outer side surfaces of tooth elements 44 and 46 of each tooth lie in the plane of the side surfaces of their associated blade 11 or 12. As illustrated by the tooth 43 in FIG. 5, the tooth elements 44 and 46 have tips 50 and 51, respectively, and have inside surfaces 47 and 48, respectively, which are beveled towards each other from the tips 50 and 51 to define a V-shaped groove or recess 52 which extends lengthwise of the blade parallel to the longitudinal dimension of the blade. The tips 50 and 51 are sharpened to points in order to more easily become embedded in the pit to prevent the same from twisting.

In the operation of the fruit cutting and pit gripping apparatus 10 of the present invention, a peach to be halved and pitted is disposed with the suture plane of the peach aligned with the plane of the blades 11 and 12 and is moved onto the blades in the direction of the arrow A into the position shown in FIG. 1. During this movement, the sharpened edges 18 and 19 cut through a part of the meat of the peach. The rod 32 is then moved to the left (FIG. 2) allowing the springs 28 to pivot the blades 11 and 12 to the closed position shown in FIGS. 2 and 4 thereby severing substantially all the peach meat and firmly clamping the teeth 41, 42 and 43 against the pit. The V-shaped recesses 52 of each of the teeth engage the pit on the rather sharply sloped surfaces thereof on opposite sides of the suture plane and tend to wedge the pit halves together to minimize the tendency of the pit to split along this plane.

Since three teeth are provided and since the teeth engage the pit at rather widely spaced points, it is apparent that a relatively small amount of gripping pressure exerted by the spring 28 will resist a considerable force tending to twist the pit. Pits of considerably different shapes or sizes can be gripped by the three teeth without adversely affecting the operation of the apparatus 10.

With the teeth 41, 42 and 43 in firm engagement with the pit, the two halves of the peach are twisted relative to the pit by means (not shown). The small portion of the peach meat which has not previously been cut, is cut when the peach halves are twisted free of the pit.

From the foregoing description it is apparent that the cutting and gripping apparatus of the present invention includes three double teeth which are not only able to firmly grip pits of various different sizes and shapes but are also able to prevent splitting of the pits along their suture planes due to the action of the inwardly beveled gripping elements.

While one embodiment of the present invention has been shown and described, it will be understood that various changes and modifications may be made without departing from the spirit of the invention or the scope of the appended claims.

Having thus described the present invention, what is claimed as new and desired to be protected by Letters Patent is:

1. A fruit cutting and pit gripping apparatus comprising a pair of sharpened blades mounted for pivotal movement between an open and a closed position, each of said blades having a recess with the recess of one blade cooperating with the recess of the other to define a pit receiving opening, a pit gripping tooth rigid with one of said blades and projecting into said pit receiving opening to grip the pit near its longitudinal midpoint, a pair of longitudinally spaced pit gripping teeth rigid with the other of said blades and projecting into said opening to grip the pit near the ends thereof, said three teeth being the sole pit gripping members and having longitudinally extending V-shaped grooves therein arranged to cooperate to firmly grip the pit at three points on each side of the suture plane of the pit when said blades are moved to a closed position, and means for moving said blades to a closed position, said three point pit gripping engagement adapting the fruit cutting and pit gripping apparatus to operate with fruit having pits which vary considerably in size and shape.

2. A fruit cutting and pit gripping apparatus comprising a pair of sharpened blades disposed in a common plane and mounted for pivotal movement between an open and a closed position, each of said blades having a recess with the recess of one blade cooperating with the recess of the other to define a pit receiving opening, one of said blades having a cut-away portion, means providing a raised portion on said other blade arranged to move into said cut-away portion when said blades are moved to the closed position, a pit gripping tooth projecting into said pit receiving opening and being rigid with one of said blades, a pair of spaced pit gripping teeth projecting into said opening and being rigid with the other of said blades, each of said teeth being V-shaped longitudinally of said blades and each tooth having a longitudinally V-shaped slot therein, said three teeth being the sole pit gripping members and being arranged to cooperate to firmly grip the pit on opposite sides of the suture plane when said blades are moved to a closed position to impart a wedging force to the pit to prevent splitting of the same, and means for moving said blades to a closed position.

3. A fruit cutting and pit gripping apparatus comprising a pair of sharpened blades mounted for pivotal movement between an open and a closed position, each of said blades having a recess with the recess of one blade cooperating with the recess of the other blade to define a pit receiving opening, a pit gripping tooth rigidly secured to each blade and projecting into said pit receiving opening, each tooth having outer walls flush with the corresponding surfaces of said blades and each tooth having a V-shaped groove disposed longitudinally relative to said blades and having inner walls slanted inwardly toward the plane of said blades to contact in wedging engagement surfaces of a pit on either side of the suture plane of the pit in said opening when said blades are moved to a closed position to prevent splitting of the pit along the suture plane, and means for moving said blades to a closed position.

4. A fruit cutting and pit gripping apparatus comprising a pair of sharpened blades mounted for pivotal movement between an open and closed position, each of said blades having a sharpened recess with the recess of one blade cooperating with the recess of the other to define a pit receiving opening, a pair of spaced pit gripping teeth secured to one of said blades and projecting into said pit receiving opening at points near the outer ends thereof to grip a pit near the ends thereof, a third pit gripping tooth secured to the other of said blades and projecting into said pit receiving opening at a point substantially midway between said pair of teeth and arranged to cooperate with said pair of teeth to grip a pit along three spaced surfaces which are bisected by the suture plane of the pit, each tooth having a V-shaped groove disposed longitudinally relative to said blades and having walls arranged to contact in wedging engagement one of said three spaced surfaces of a pit in said opening when said blades are moved to a closed position, and means connected to said blades and arranged to move said blades between the opened and closed position, said wedging grip of said teeth with the pit being effective to prevent the peach from splitting along its suture plane, said three V-shaped pit gripping teeth constituting the sole gripping elements and each tooth having outside transversely opposed walls which are flush with the corresponding sides of the associated blades.

References Cited in the file of this patent

UNITED STATES PATENTS

| | | |
|---|---|---|
| 2,594,362 | Skog | Apr. 29, 1952 |
| 2,652,085 | Ansley | Sept. 15, 1953 |
| 2,826,227 | Perrelli et al. | Mar. 11, 1958 |

FOREIGN PATENTS

| | | |
|---|---|---|
| 164,804 | Australia | Aug. 25, 1955 |